C. H. SAMPSON.
CHECK WRITING MACHINE.
APPLICATION FILED SEPT. 8, 1915.

1,309,371.

Patented July 8, 1919.
8 SHEETS—SHEET 1.

INVENTOR
Charles H Sampson
BY
H. H. Simms
ATTORNEY

C. H. SAMPSON.
CHECK WRITING MACHINE.
APPLICATION FILED SEPT. 8, 1915.

1,309,371.

Patented July 8, 1919
8 SHEETS—SHEET 4.

Fig. 4

INVENTOR
Charles H. Sampson
BY
H. H. Simms
ATTORNEY

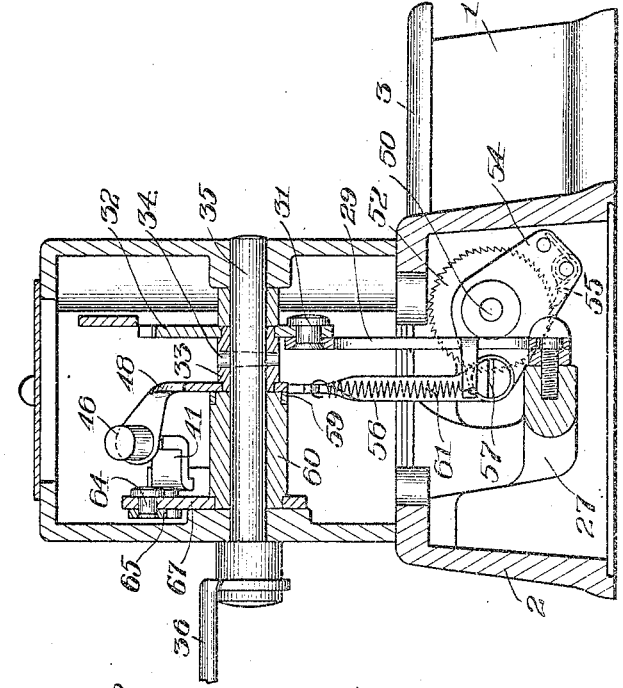

C. H. SAMPSON.
CHECK WRITING MACHINE
APPLICATION FILED SEPT. 8, 1915.
1,309,371.
Patented July 8, 1919.
8 SHEETS—SHEET 6.
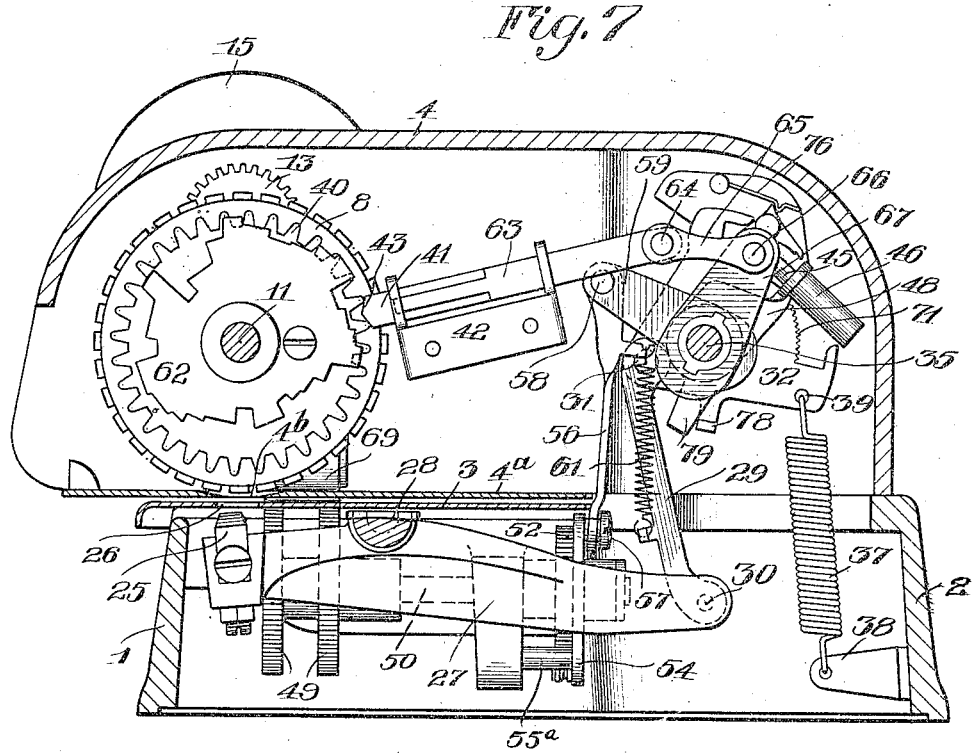
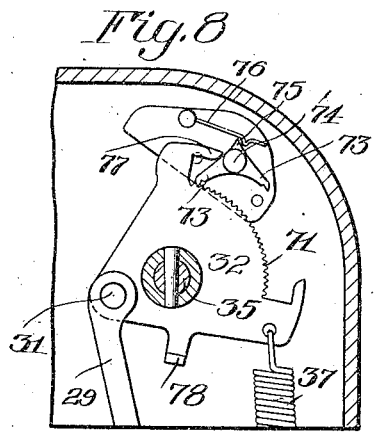
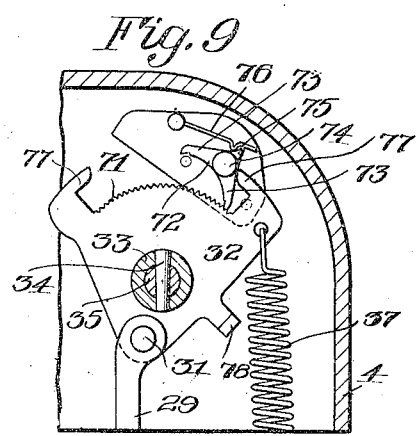
INVENTOR
Charles H Sampson
BY
H H Liming
ATTORNEY

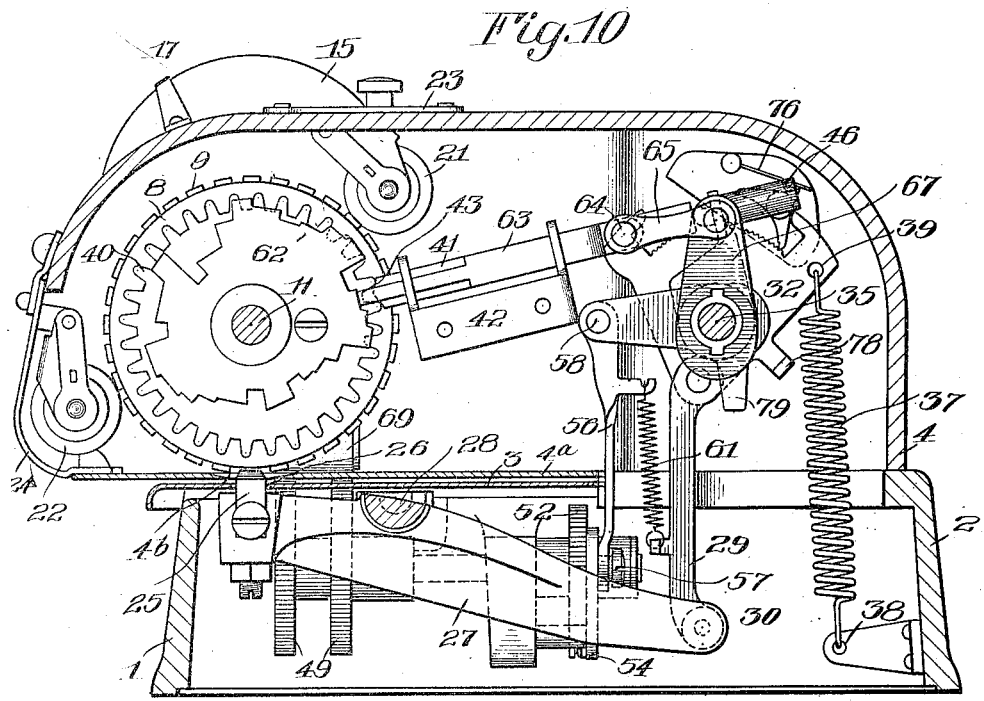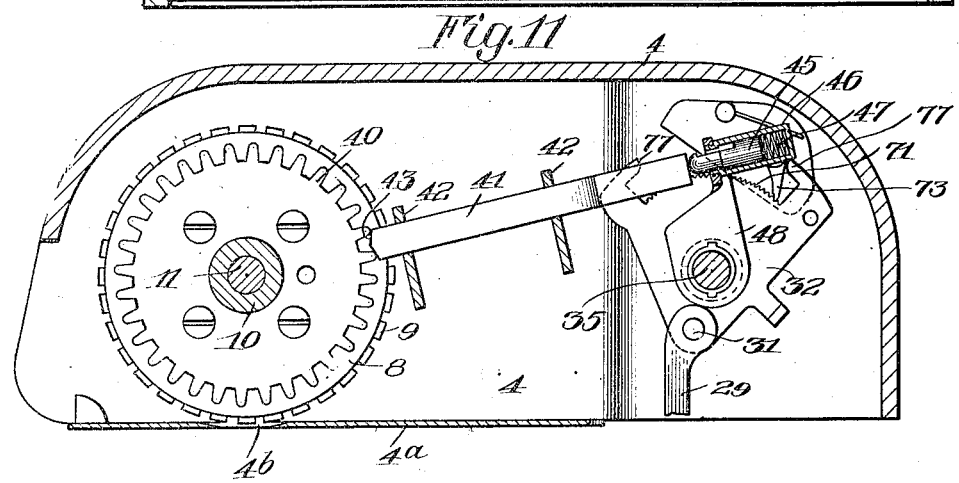

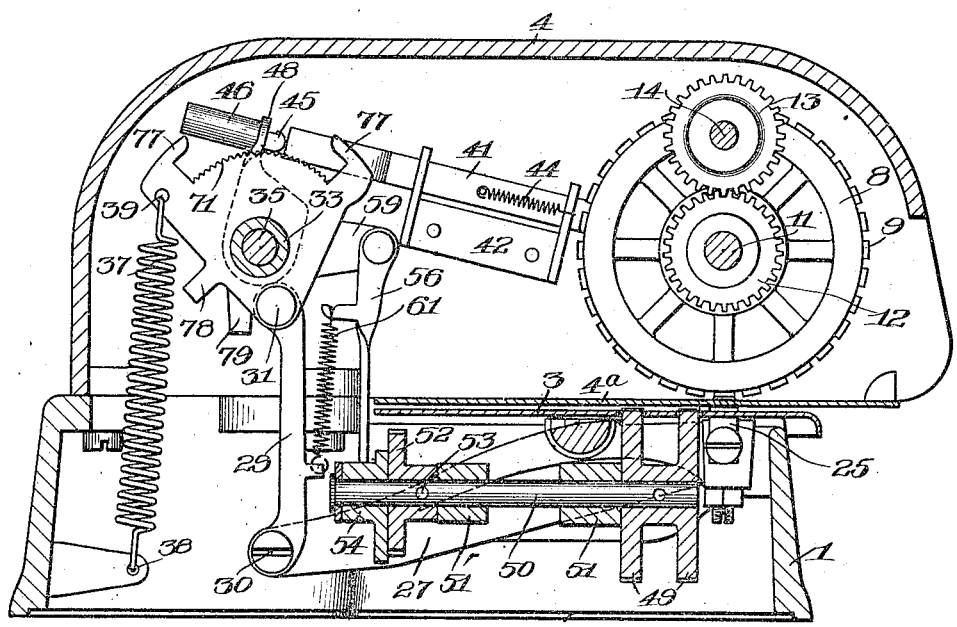
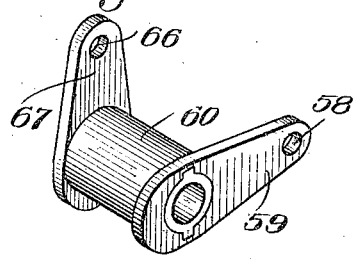 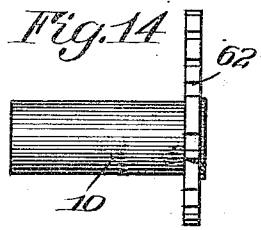

UNITED STATES PATENT OFFICE.

CHARLES H. SAMPSON, OF ROCHESTER, NEW YORK, ASSIGNOR, BY MESNE ASSIGN-MENTS, TO TODD PROTECTOGRAPH COMPANY, OF ROCHESTER, NEW YORK, A CORPORATION OF NEW YORK.

CHECK-WRITING MACHINE.

1,309,371.          Specification of Letters Patent.          Patented July 8, 1919.

Application filed September 8, 1915. Serial No. 49,429.

*To all whom it may concern:*

Be it known that I, CHARLES H. SAMPSON, of the city of Rochester, in the county of Monroe and State of New York, have invented a new and useful Check-Writing Machine, fully set forth in the following specification and shown in the accompanying drawings.

The present invention relates to printing apparatus, and more particularly to printing machines, known as "check writers," in which a plurality of type forms representing words of varying length are successively impressed upon the work, the latter being fed between the successive impressions variable distances corresponding to the lengths of the words printed.

One object of this invention is to provide a machine of this type capable of performing the functions usual in such machines in an effective and convenient manner, and at the same time characterized by a construction which is simple and inexpensive to manufacture.

Another object of the invention is to provide a construction in which it will be impossible to move the feeding devices without effecting a complete forward and return movement of the operating member which also effects the relative movement between the printing member and the platen so that it will be impossible to manipulate the machine either purposely or unintentionally to produce an unequal spacing between the words.

Still another object of the invention is to provide a centering device adapted to center and lock the printing member against rotation while the relative movement is taking place between the platen and the printing member for effecting the printing operation, and, at the same time, adapted to act as a brake on the printing member to prevent a too free movement of the latter while it is being shifted to present a line of type to the printing point.

To these and other ends, the invention consists in certain parts and combinations of parts all of which will be hereinafter described, the novel features being pointed out in the appended claims.

In the drawings:

Fig. 4 is a plan view of the machine with the top portion of the casing removed to show the interior parts;

Fig. 5 is a section on the line *a—a*, Fig. 4;

Fig. 6 is a section on the line *b—b*, Fig. 4;

Fig. 7 is a section on the line *c—c*, Fig. 5;

Figs. 8 and 9 are detail views of the mechanism which controls the movement of the operating lever to prevent the shifting of the latter in an opposite direction until it reaches the ends of its movement;

Fig. 10 is a view similar to Fig. 7 showing the position of the parts of the machine while the platen is engaging the printing wheel;

Fig. 11 is a detail view showing the operation of the centering device;

Fig. 12 is a section on the line *d—d*, Fig. 4;

Fig. 13 is a detail view of a portion of a connection between the gage member and the feeding devices; and Fig. 14 is a detail view of the gage member.

Figure 1:
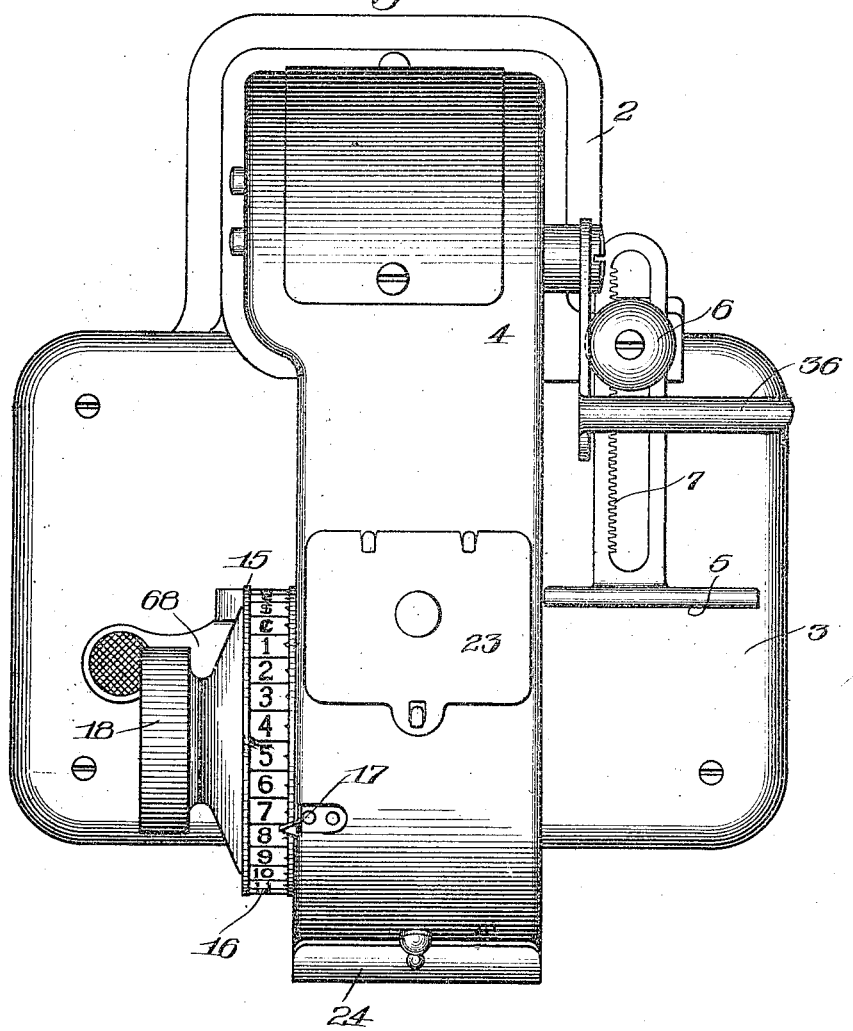
Figure 1 is a plan view of a machine embodying the present improvements.
Figure 2:
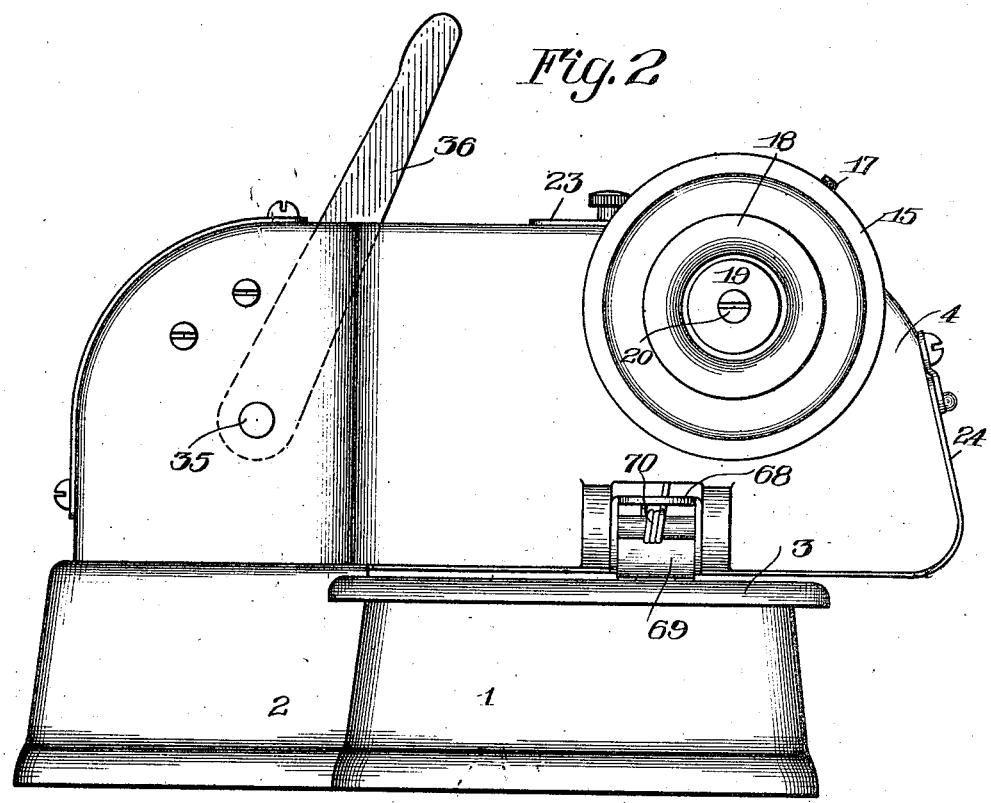
Fig. 2 is a side view of the same machine.
Figure 3:
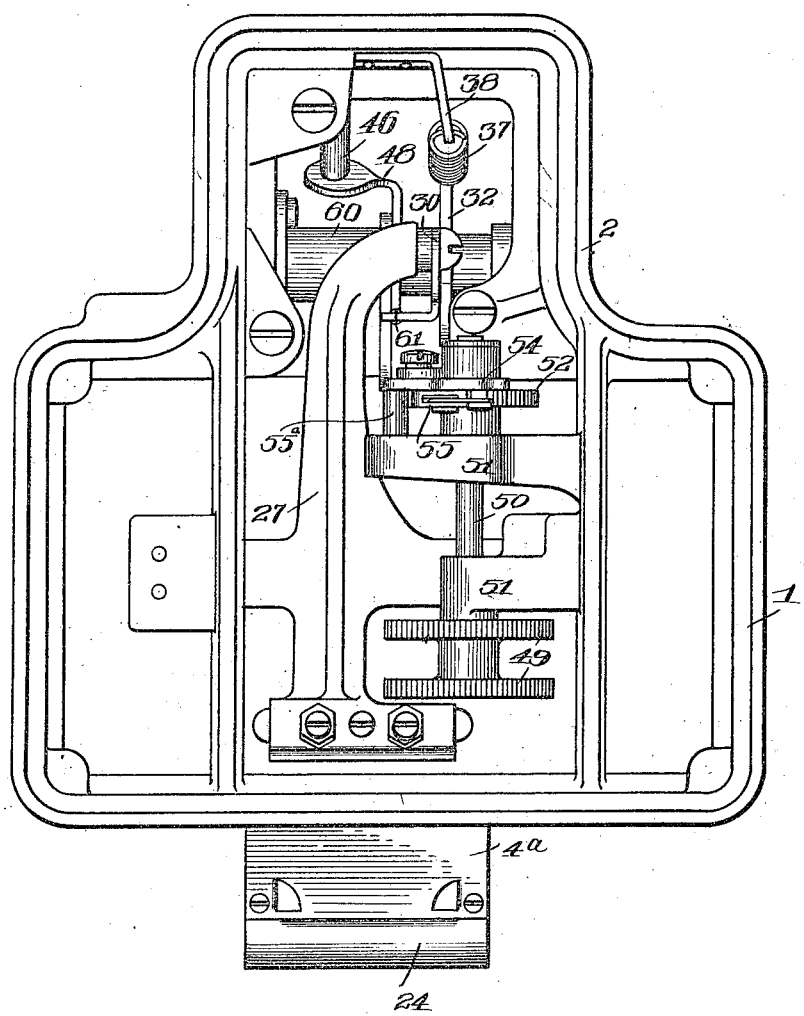
Fig. 3 is a bottom view of the machine.

Referring more particularly to the drawings, 1 indicates a hollow base on the main frame having a reduced extension 2 at its rear and a work supporting plate 3 secured to the top thereof in front of the reduced portion 2. Secured to the upper side of the reduced portion 2 is a frame 4 which projects over the work support 3 in slightly spaced relation to the latter in order to form a forwardly opening slot in the machine frame as a whole. The bottom of this overhanging portion is closed by a plate 4ª which is formed with a slot 4ᵇ through which the printing wheel may be reached. The position of the work on the work support 3 may be determined by a stop or gage 5 which is moved forwardly and rearwardly by a rotary member 6 having a gear not shown connected thereto and meshing with a rack 7 on the gage 5 all of which is described in Patent No. 1,141,270 granted to me on the first day of June, 1915.

The printing member is preferably in the form of a wheel 8 having lines of type 9 of different lengths projecting from the periphery thereof, the type being provided with serrations or grooves in their printing faces for coöperation with a similarly formed platen face to shred the paper during the printing operation, as disclosed in U. S. Letters Patent No. 793,249, granted to L. M. Todd, June 27, 1905. The type lines are parallel to the axis of rotation of the wheel and are uniformly spaced from each other circumferentially thereof. As shown in Fig. 4, the characters on the type wheel are arranged with the beginning of the characters in alinement with each other circumferentially of the wheel. Each line preferably represents a different word and the words are so selected that combinations of them can be made for writing any amount within two limits in the body of a check or other negotiable instrument. In the present instance, the wheel 8 is rigidly secured to a sleeve 10 which turns on a fixed bearing pin 11 secured in the overhanging portion. For turning the printing wheel to position any line of type over the printing point, the wheel has a pinion 12 integral therewith and engaged by a pinion 13 which is rigidly secured to a stub shaft 14 mounted to turn in the casing frame 4 above the pin 11 and parallel with the axis of the printing wheel. Arranged on this stub shaft on the exterior of the casing is a dial wheel 15 having a dial 16 thereon for coöperation with an index or pointer 17 arranged on the casing. A thumb wheel 18 fits on the reduced portion of the dial wheel 15, and both parts are held to the stub shaft 14 by a washer 19 and a screw 20.

The printing member may be inked in any suitable manner, but, in this instance, two ink rollers 21 and 22 coöperate therewith at substantially diametrically opposite points, these rollers being carried by plates 23 and 24 respectively removably secured in place by a means which does not form any part of the present invention.

For coöperation with the type wheel or printing member, a platen 25 is provided preferably having its impression surface provided with serrations or grooves similar to those on the type and adapted for intermeshing coöperation therewith. This platen is designed to move through a slot 26 in the work supporting plate 3 and through the slot 4ᵇ in order to coöperate with the line of type on the printing wheel over the printing point. Preferably, this platen is adjustably mounted on the forward end of a lever 27 which is pivoted at 28 on segmental bearings below the work supporting plate 3 and extends rearwardly into the reduced portion 2 of the hollow base. For operating this platen carrying lever, a link 29 is pivotally connected at 30 to the rear end of the lever and is also pivotally and eccentrically connected at 31 to a crank plate 32 that is rigidly secured to a sleeve 33 pinned at 34 to an operating shaft 35, the latter being journaled in the frame above the reduced portion 2 of the base and extending to the exterior of the casing where it is provided with an operating handle or member 36. A spring 37 is anchored at one end at 38 to the casing and at its other end at 39 to the crank plate 32, this spring serving to return the platen to its normal position away from the printing member after the printing action has been completed.

To the end that the printing wheel will not move too freely, and at the same time will be centered and locked in printing position when the platen is moved, the following instrumentalities are provided. To the printing wheel, a toothed wheel 40 is connected and coöperating with this toothed wheel is a centering device in the form of a slide 41 which is guided in a bracket 42 and has an end 43 formed with converging faces adapted to wedge themselves between any two teeth on the toothed wheel 40. This slide is yieldingly held toward the toothed wheel by a spring 44, the coöperation between the end 43 and the teeth being such that the slide or centering device yields during the rotation of the printing wheel and acts as a brake on such rotation. The other end of this slide is adapted to be engaged by a yieldingly mounted device 45 pressed outwardly within the housing 46 by a spring 47, the housing 46 being eccentrically carried by an arm 48 which is rigidly secured to the sleeve 33 on the shaft 35. During the rotation of the printing wheel to position any line of type thereon at printing point, the yielding device 45 on the operating shaft 35 lies out of coöperative relation with the centering device 41 but shortly after the shaft 35 starts to turn to move the platen toward the printing member, the device 45 engages the outer end of the slide 41 and, in this way, places still greater tension on the slide 41 thereby causing the latter to exert greater pressure on the wheel 40 so that the tapered end 43 of the slide 41 acts to center the printing member. Later the pressure increases to such an extent that finally the slide 41 is held firmly against the toothed member 40, thus locking the member and the printing wheel against any movement whatsoever until the platen is moved away from the printing member.

The work is fed after each printing operation a distance corresponding in length to the word or type line previously printed, plus a small distance to provide a small, uniform spacing between adjacent words. In this instance, this feeding mechanism embodies a pair of roughened faced feed wheels 49 which operate through the work supporting plate 3 in rear of the platen and which are mounted upon a common shaft 50 journaled in the base frame at 51. This shaft also has arranged thereon a ratchet wheel 52 which is pinned to shaft at 53. Also turning on the shaft 50 is a swinging member 54 which carries a spring pressed pawl 55. When the swinging member is moved in one direction, the pawl will ride freely over the ratchet 52 without operating the latter, its movement in this direction being limited by a variable means presently to be described. When the swinging member 54 rotates in the other direction, the pawl 55 engages the ratchet 52 and turns the latter with the feed wheels, its movement in this direction being limited by contact with a stop pin 55ᵃ. For operating this swinging member 54, a link 56 is pivotally connected thereto at 57 and is also pivotally connected at 58 to an arm 59 which is secured to an oscillatory member or sleeve 60 that turns on the operating shaft 35. The link 56 is resiliently connected to the link 29 of the platen operating mechanism by a spring 61, which forms a yieldable means for imparting movement from the platen operating mechanism to the pawl 55 to produce the idle movement of the latter referred to above.

To the end that the movement of the feeding devices will be variable to correspond with the length of the word previously printed, there is provided a stop or gage member 62 integral with the sleeve 10 so that its axis is common to that of the rotary printing member 8 and so that it turns with the rotary printing member. This stop member has a plurality of stop shoulders thereon one corresponding to each of the lines of type on the printing member and each shoulder is arranged at a radial distance from the axis of the member which is inversely proportional to the length of the corresponding type form. For coöperation with this stop or gage member, controlling means is provided preferably in the form of a slide 63 guided on the bracket 42 and adapted to coöperate at one end with the stop or gage member, its other end being pivotally connected at 64 with a link 65 that in turn is pivoted at 66 to an arm 67 which extends laterally from the sleeve 60. The stop shoulders are so arranged that when a line of type is brought to printing position the corresponding stop shoulder is moved to position for contact with the slide 63. In this way, when the platen operating mechanism is operated to move the platen toward the printing wheel, this mechanism transmits motion by means of the spring 61 to the link 56 which not only turns the operating member 54 but also turns the oscillatory sleeve 60, shifting the slide 63 into engagement with one of the stops on the stop member 62 after which the movement of the link 56 is stopped, the spring 61 yields, and the platen operating mechanism continues to move the platen toward the printing member. Upon the return of the platen after making an impression, the slide 63 moves out of contact with the stop member 62 and the operating member 54 shifts the feeding devices by a positive action to feed the work due to the fact that the crank plate 32 is provided with an abutment 78 which coöperates with an abutment 79 on the oscillatory sleeve 60. The operation of these parts is so timed that the pawl 55 is first set to its variable position for starting the feeding movement, the platen then retracted to release the work, and finally the pawl 55 actuated to move the feeding wheels 49. The gage is so designed that for each line of type printed the work is fed a distance of corresponding length plus a small additional distance to provide a space between adjacent words.

For coöperation with the feeding devices there may be provided a clamping or holding member comprising a lever 68 having a portion extending on the exterior of the casing and carrying at its other end a roller 69 which is pressed into engagement with the feeding wheels 49 by a spring 70. The work is released from or presented to the feeding device by depressing the outer end of this lever.

Unless some means were provided for preventing such action, a partial movement of the operating crank 36 would effect an actuation of the feeding mechanism without producing an impression. In order to prevent such partial or incomplete actuation of the operating crank, the following instrumentalities are provided: On the crank plate 32, a toothed portion 71 is provided concentric with the axis of the operating shaft 35, and with this toothed portion engages a pawl 72 having two noses 73 and pivoted at 74 between its noses. Also arranged on the pawl is a projection 75 which is engaged by a spring arm 76 which yieldingly holds the pawl in either one of two positions depending upon the position to which it is tripped. For tripping the pawl alternately in opposite directions, two trip devices 77 are arranged on the crank plate 32 at opposite ends of the toothed portion 71, these trip devices operating to present alternately the noses 73 to the toothed portion so that when the operating member is moving in one direction, it will be held against rotation in the other direction until the end of its movement has been reached when the pawl will be shifted to permit movement in the other direction only.

The operation of the invention will be understood from the foregoing but it may be summarized as follows:

The finger wheel 18 is turned to present the proper line of type to the printing point. This also sets the stop wheel 62 which determines the length of the feed of the feeding devices. The depression of the lever 36 turns the shaft 35 to swing the platen carrying lever 27 so that the platen 25 coöperates with the line of type at the printing point. Before the platen engages the printing line, the spring 61 transmits motion to the operating member 54 in order to set the latter in position to advance the work after the platen moves away from the printing member. At the same time, the slide 63 moves into coöperation with the stop member 62 and determines the amount of movement of the operating member 54. Upon the return movement of the platen operating mechanism under the action of the spring 37, the operating member 54 moves to shift the work a distance corresponding to the length of the word printed and the parts assume their normal positions ready for another operation. The operating member 36 is compelled to be moved to the limit of its motion in each direction before it can make a return motion as the pawl 72 coöperates with the toothed portion 71 and prevents any return movement.

A check writing machine constructed in accordance with this invention is simple in its operation and inexpensive to manufacture. The parts employed for producing the functions of the machine have been reduced to a minimum and the construction of these parts is such that machine work thereon has been materially reduced. A single device acts as a brake on the printing wheel, and, at the same time, is utilized for locking said printing wheel against movement while the platen operating mechanism is operated. The feeding devices and the platen operating mechanism are so connected that it is impossible to operate the feeding devices without causing the platen to engage with the printing member. While the invention has been illustrated in a machine in which the platen moves toward the printing wheel, it will be understood that certain of the features are not limited to this construction but may be used in any construction in which there is a printing couple such as a printing member and a platen.

What I claim as my invention and desire to secure by Letters Patent is:

1. In a printing apparatus, the combination of a type carrier rotatable to bring types of various lengths, selectively, to printing position; a platen for successive coöperation with said types; variable feeding means comprising a gage, a device adapted to rock about an axis parallel with that of said carrier, a sliding contact member for coöperation with said gage having a link connection with said rocking device for actuation thereby, a member adapted to engage the work and having a connection with said rocking member for actuation thereby; and an operating means for effecting a relative printing movement of said carrier and platen and for producing an actuation of said feeding means corresponding to each impression.

2. In a printing apparatus the combination of a type carrier rotatable to bring types of various lengths, selectively, to printing position; a platen for successive coöperation with said types; an operating shaft; means connected with said shaft for effecting a relative printing movement of the carrier and platen; a gage connected with said carrier for adjustment therewith; a device controlled in one direction by engagement with said gage; means in engagement with the work for feeding the latter and having a connection with said controlled device; and means connected with said shaft for effecting yieldably a movement of said device until stopped by said gage and for effecting a positive movement of said device in the opposite direction to feed the work.

3. In a check writing machine, the combination with a casing having a forwardly opening slot, of a printing member mounted in the casing above the slot, a platen mounted in the casing below the slot, a lever pivoted between its ends and carrying the platen at its forward end, a horizontally arranged shaft supported by the casing above and in rear of the slot, a link eccentrically connected to said shaft and also connected to the rear end of the lever, a locking device for the printing wheel controlled by the shaft, and a spring acting on said shaft to return the platen to its normal position and release the locking device.

4. In a check writing machine, the combination with a printing member and a platen, one of which is movable toward and from the other to effect the printing, of operating mechanism for effecting such relative movement embodying an oscillatory operating shaft having connection with such movable part, and variable feeding mechanism for feeding the work relatively to the platen and the printing member embodying gaging means moving with the printing member, a feeding member, a member coöperating with the gaging means, an oscillatory member mounted on the oscillatory operating shaft and having a ratchet connection with the feeding member and a connection with the member that coöperates with the gaging means, and a resilient connection between the operating mechanism and the feeding mechanism.

5. In a check writing machine, the combination with a printing member and a platen movable toward the printing member for effecting the printing, of operating mechanism for effecting such movement embodying an oscillatory shaft, variable feeding mechanism for feeding the work relatively to the platen and the printing member and embodying a plurality of stop shoulders moving with the printing member, a feeding member, a member coöperating with the stop shoulders, an oscillatory member mounted to turn about an axis common to that of the oscillatory shaft and having a ratchet connection with the feeding member and a connection with the member that coöperates with the stop shoulders, and a resilient connection between the platen operating mechanism and the feeding mechanism.

6. In a check writing machine, the combination with a printing member and a platen movable toward and from the printing member for effecting the printing, of mechanism for effecting such movement embodying an oscillatory shaft, variable feeding mechanism for feeding the work relatively to the platen and the printing member and embodying gaging means moving with the printing member, a feeding member, a member coöperating with the gaging means, and an oscillatory member mounted to turn on the oscillatory shaft and having a ratchet connection with the feeding member and a connection with the member that coöperates with the gaging means, and a resilient connection between the platen operating mechanism and the feeding mechanism.

7. In a check writing machine, the combination with a printing member and a platen movable toward the printing member for effecting the printing, of operating mechanism for effecting such movement embodying an oscillatory shaft and a spring for returning the shaft to normal position, variable feeding mechanism for feeding the work relatively to the platen and the printing member and embodying gaging means movable with the printing member, a feeding member, a slide for coöperating with the gaging means, and an oscillatory member mounted on the oscillatory shaft and having a link connection with the slide, said oscillatory member also having a ratchet connection with the feeding member, a resilient connection between the platen operating mechanism and the feeding mechanism to set the feeding mechanism in position to feed the work as the platen is moved toward the printing member, and abutments carried by the oscillatory shaft and the oscillatory member by which the spring operates the feeding mechanism.

8. In a check writing machine, the combination with a printing member and a platen movable toward the printing member for effecting the printing, of operating mechanism for effecting such movement embodying an oscillatory shaft, variable feeding mechanism for feeding the work relatively to the platen and the printing member and embodying gaging means moving with the printing member, a rotary feed member having a ratchet wheel connected thereto, a pawl for coöperation with said ratchet, an operator for the pawl, an oscillatory member mounted on the oscillatory shaft and having a link connection with the pawl operator, a member for coöperation with the gaging means having connection with the oscillatory member, and a resilient connection between the platen operating mechanism and the feeding mechanism.

9. In a check writing machine, the combination with a casing having a check slot, a printing wheel arranged on one side of the slot and having a plurality of lines of type thereon of different lengths extending parallel to the axis thereof and a platen arranged on the other side of the slot, of operating mechanism for moving the platen toward the printing wheel, embodying a horizontally arranged shaft, and a variable feed mechanism for moving the work in the direction of the axis of the printing wheel relatively to the platen after each printing operation a distance corresponding to the length of the word previously printed embodying a feed member, a plurality of stop shoulders turning with the printing wheel, an oscillatory member mounted to turn on said horizontally arranged shaft connected to the feed member and also having a connection engaging the stop shoulders, and a resilient connection between the platen operating mechanism and the variable feed mechanism.

10. In a check writing machine, the combination with a casing having a check slot, a printing wheel arranged on one side of the slot and having a plurality of lines of type thereon of different lengths extending parallel to the axis thereof and a platen arranged on the other side of the slot, of operating mechanism for moving the platen toward the printing wheel, embodying a horizontally arranged shaft and a spring for moving the platen away from the printing wheel, and variable feed mechanism for moving the work in the direction of the axis of the printing wheel relatively to the platen after each printing operation a distance corresponding to the length of the word previously printed embodying a feed member, a plurality of stop shoulders moving with the printing member, an oscillatory member mounted to turn about the axis of the horizontal shaft, parts carried by the shaft and the oscillatory member constructed to engage one with the other to move the member to normal position by the action of the spring, connection between the feed member and the oscillatory member, connections whereby the stops control the movement of the oscillatory member, and a resilient connection between the platen operating mechanism and the variable feed mechanism.

11. The combination with a printing wheel and a platen movable toward the printing wheel, of mechanism for moving the platen toward the printing wheel, a toothed wheel moving with the printing wheel, a yieldingly mounted centering device coöperating with the toothed wheel, and a yielding device moved by the platen-operating mechanism into engagement with the yieldingly mounted centering device to lock the latter against movement when the platen moves toward the printing wheel.

12. The combination with a printing wheel and a platen movable toward the printing wheel, of mechanism for moving the platen toward the printing wheel embodying an oscillatory shaft, a toothed wheel connected to the printing wheel, a yieldingly mounted slide having one end coöperating with the toothed wheel to center the printing wheel, and a yieldingly mounted device eccentrically carried by the oscillatory shaft to coöperate with the other end of the centering slide when the platen is moved toward the printing wheel.

13. The combination with a differentially adjustable printing wheel, of an invariably moved printing platen coöperating therewith, a toothed disk rigid with the printing wheel, a spring operated plunger normally coöperating with the toothed disk to aline the printing wheel, and an invariably moved means for locking the alining plunger and thereby the printing wheel preparatory to printing.

CHARLES H. SAMPSON.